United States Patent
Abboud et al.

(10) Patent No.: US 8,453,620 B2
(45) Date of Patent: Jun. 4, 2013

(54) SYSTEMS AND METHODS FOR IMPROVED ENGINE START-STOP RESPONSE

(75) Inventors: Amin Abboud, Livonia, MI (US); Norman Schoenek, Novi, MI (US); Qi Ma, Farmington Hills, MI (US); Gary E. McGee, Oxford, MI (US); Joseph R. Dulzo, Novi, MI (US)

(73) Assignee: GM Global Technology Operations LLC

( * ) Notice: Subject to any disclaimer, the term of this patent is extended or adjusted under 35 U.S.C. 154(b) by 460 days.

(21) Appl. No.: 12/787,081

(22) Filed: May 25, 2010

(65) Prior Publication Data

US 2011/0290212 A1 Dec. 1, 2011

(51) Int. Cl.
*F02D 7/00* (2006.01)

(52) U.S. Cl.
USPC .......... 123/333; 123/481; 123/198 DB; 123/179.28

(58) Field of Classification Search
USPC .......... 123/481, 436, 198 DB, 325, 326, 123/332, 333, 179.4, 179.7, 179.12, 179.16, 179.25, 179.28, 491; 701/103–104, 110, 701/112–113
See application file for complete search history.

(56) References Cited

U.S. PATENT DOCUMENTS

| | | | | |
|---|---|---|---|---|
| 6,453,864 | B1 * | 9/2002 | Downs et al. | 123/179.3 |
| 7,706,961 | B2 * | 4/2010 | Tetsuno | 701/113 |
| 7,823,471 | B2 * | 11/2010 | Tamai et al. | 74/89.4 |
| 7,891,330 | B2 * | 2/2011 | Kishibata et al. | 123/179.3 |
| 7,962,278 | B1 * | 6/2011 | Patterson et al. | 701/113 |
| 8,195,380 | B2 * | 6/2012 | Patterson et al. | 701/113 |
| 2011/0017165 | A1 * | 1/2011 | Osawa et al. | 123/179.4 |
| 2012/0160202 | A1 * | 6/2012 | Vogt et al. | 123/179.25 |

\* cited by examiner

*Primary Examiner* — Hai Huynh

(57) ABSTRACT

A control system for a vehicle that includes an engine includes an engine-stop module and a fuel control module. The engine-stop module determines whether to stop the engine based on at least one of input from a driver of the vehicle and vehicle operating parameters. The fuel control module stops the engine and controls a rate of engine speed decay by disabling fueling to cylinders of the engine according to a predetermined sequence.

20 Claims, 4 Drawing Sheets

SYSTEMS AND METHODS FOR IMPROVED ENGINE START-STOP RESPONSE

FIELD

The present disclosure relates to internal combustion engines and more particularly to systems and methods for improved response during engine start-stop operations.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to drive pistons that rotatably turn a crankshaft generating drive torque. The drive torque may be transferred to a driveline (e.g., wheels) of a vehicle via a transmission. The drive torque generated by the engine may be based on input from a driver of the vehicle (e.g., via an accelerator). The input from the driver of the vehicle, however, may also include other inputs (e.g., braking).

A start-stop system may selectively stop and restart an engine during vehicle operation to increase fuel economy. In other words, the start-stop system may shutdown the engine when drive torque from the engine is not required. Specifically, the start-stop system may selectively stop and restart the engine during vehicle operation based on the input from the driver and/or other operating parameters (e.g., vehicle speed, engine speed, etc.). For example, the start-stop system may stop the engine as the vehicle slows to a stop at a stop light and then restart the engine when the driver accelerates (e.g., when the stop light changes).

SUMMARY

A control system for a vehicle that includes an engine includes an engine-stop module and a fuel control module. The engine-stop module determines whether to stop the engine based on at least one of input from a driver of the vehicle and vehicle operating parameters. The fuel control module stops the engine and controls a rate of engine speed decay by disabling fueling to cylinders of the engine according to a predetermined sequence.

A control system for a vehicle that includes an engine includes an engine-stop module and a position control module. The engine-stop module determines whether to stop the engine based on at least one of input from a driver of the vehicle and vehicle operating parameters. The position control module stops the engine by engaging a starter to a crankshaft of the engine and actuating the starter to command the crankshaft to a desired position, wherein the desired position corresponds to a first cylinder of the engine having a compression cycle.

A method for controlling an engine of a vehicle includes determining whether to stop the engine based on at least one of input from a driver of the vehicle and vehicle operating parameters, and stopping the engine and controlling a rate of engine speed decay by disabling fueling to cylinders of the engine according to a predetermined sequence.

A method for controlling an engine of a vehicle includes determining whether to stop the engine based on at least one of input from a driver of the vehicle and vehicle operating parameters, and stopping the engine by engaging a starter to a crankshaft of the engine and actuating the starter to command the crankshaft to a desired position, wherein the desired position corresponds to a first cylinder of the engine having a compression cycle.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
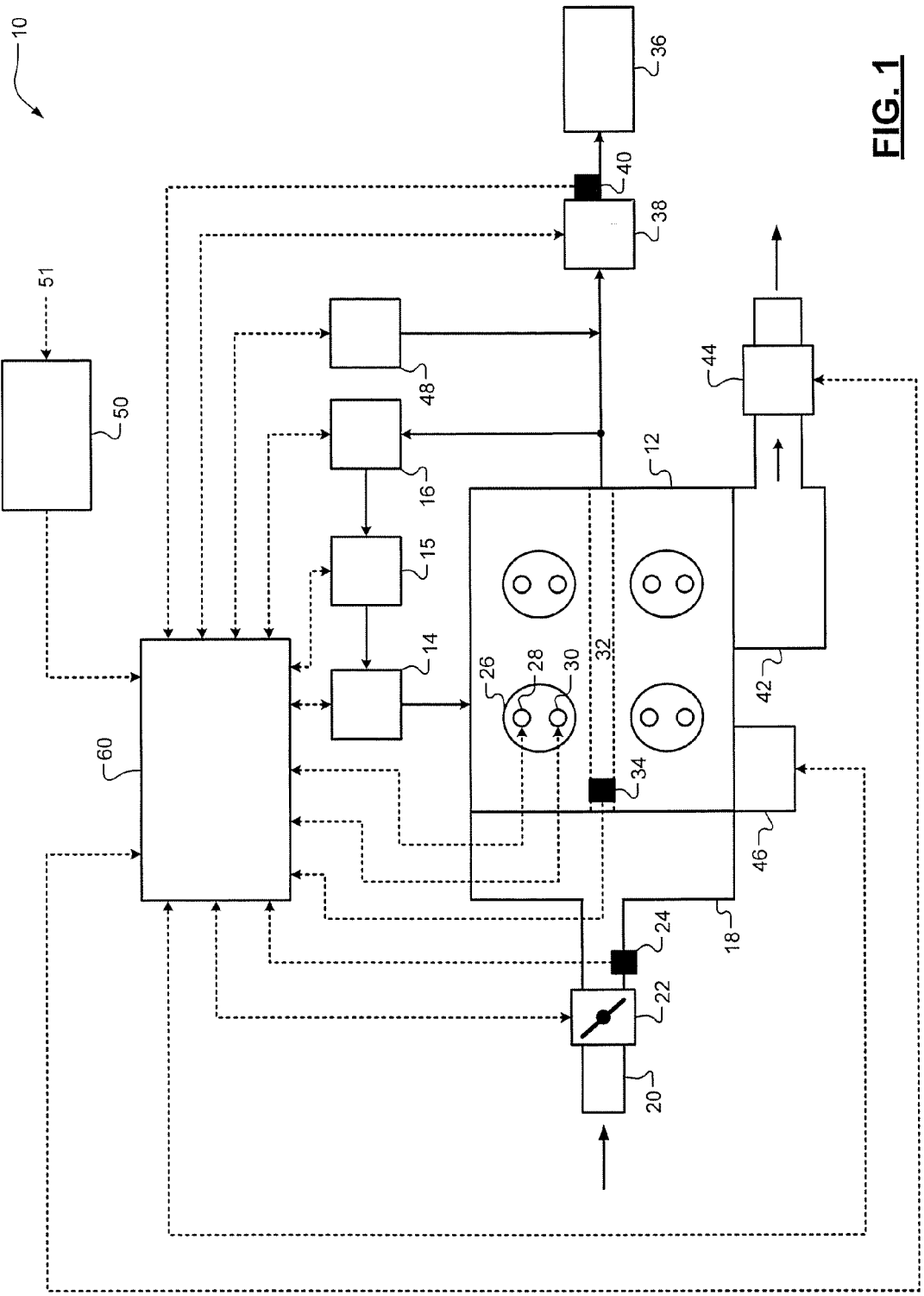
FIG. 1 is a functional block diagram of an exemplary powertrain system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Conventional engine start-stop systems selectively stop and restart an engine based on input from a driver of a vehicle (e.g., acceleration, braking, etc.) and/or other operating parameters (e.g., vehicle speed, engine speed, etc.). For example, the engine start-stop system may stop the engine when the driver is braking and vehicle speed and engine speed are less than predetermined thresholds, respectively (e.g., approaching a stop light). Additionally, for example, the engine start-stop system may then restart the engine when the driver begins accelerating (e.g., after the stop light changes).

The driver input, however, may rapidly change during a period. For example, the driver may initially brake and slow the vehicle (e.g., indicating an approaching stop light), but may then abruptly begin accelerating (e.g., after an unexpected turn). Engine start-stop systems, therefore, may require fast response to prevent driver discomfort (e.g., noise/ vibration/harshness, or NVH). Conventional engine start-stop systems, however, wait for the engine speed to decrease below a predetermined speed before the engine may be started again. Specifically, waiting for the engine speed to decrease below the predetermined speed may provide for synchronization between a camshaft and a crankshaft and thus may prevent damage. Conventional start-stop systems, therefore, may suffer from delayed response during engine start-stop operations.

Accordingly, systems and methods are presented for improved response during engine start-stop operations. The systems and methods may disable fueling to cylinders of the engine according to a predetermined sequence. Disabling fueling to the cylinders according to the predetermined sequence allows the systems and methods to control a rate that engine speed (i.e., a rotational speed of a crankshaft of the engine) decreases (hereinafter referred to as "a rate of engine speed decay"). More specifically, the systems and methods may control the rate of engine speed decay to stop the crankshaft at a desired position. For example, the desired position may correspond to a first cylinder having a compression cycle after restarting the engine. Additionally, for example, the systems and methods apply a load to the engine to increase the rate of engine speed decay (i.e., greater than a passive rate engine speed decay).

The systems and methods may engage a pinion of a starter to a ring gear coupled to the crankshaft at less than an engagement threshold. In other words, the starter may not be fully engaged with the crankshaft (i.e., partial engagement). The systems and methods may then monitor the position of the crankshaft. When the position of the crankshaft is within a predetermined distance (e.g., crank angle degrees, or CAD) from the desired position, the systems and methods may command the crankshaft to the desired position. More specifically, the systems and methods may energize the starter (e.g., via a proportional current or voltage) to stop the crankshaft at the desired position.

Finally, the systems and methods may then selectively restart the engine (e.g., when a driver of the vehicle accelerates). The systems and methods may restart the engine by enabling fueling to the cylinders. More specifically, the systems and methods may enable fueling to the cylinders beginning with the first cylinder having a compression cycle. For example, the systems and methods may disable/enable fueling by generating control signals for fuel injectors associated with the cylinders. The faster engine speed decay in addition to the positioning of the crankshaft and precise refueling to the cylinders may result in faster and/or smoother engine start-stop operations.

Referring now to FIG. 1, a powertrain system 10 for a vehicle includes an engine 12. For example, the engine 12 may be a spark ignition (SI) engine. The engine 12, however, may also be a different type of engine (e.g., a diesel engine, a homogeneous charge compression ignition, or HCCI engine, etc.). The powertrain system 10 may also include an electric motor 14, a battery system 15, and a generator 16. For example, the battery system 15 may power (via the electric motor 14) engine and vehicle components (e.g., NC) when the engine 12 is off. Additionally, for example, the generator 16 may be powered by the engine 12 (e.g., via a crankshaft 32) and may charge the battery system 15 when the engine 12 is on.

Air is drawn into an intake manifold 18 of the engine 12 through an inlet system 20 that may be regulated by a throttle 22. A mass air flow (MAF) sensor 24 may measure a MAF rate into the intake manifold 18. For example, the MAF measurement may indicate a load on the engine 12. The air in the intake manifold 18 may be distributed to a plurality of cylinders 26. While four cylinders are shown, the engine 12 may include other numbers of cylinders. The air in the cylinders 26 may be combined with fuel from a plurality of fuel injectors 28 to create an air/fuel (A/F) mixture. Specifically, the fuel injectors 28 may inject the fuel via intake ports of the cylinders 26, respectively (e.g., port fuel injection) or directly into the cylinders 26 (e.g., direct fuel injection).

The A/F mixture in the cylinders 26 may be compressed by pistons (not shown) and ignited by spark provided by a plurality of spark plugs 30. The A/F mixture, however, may also be combusted via other methods depending on the type of engine (e.g., diesel engines, HCCI engines, etc.). The combustion of the A/F mixture within the cylinders 26 drives the pistons (not shown) which rotatably turn the crankshaft 32 generating drive torque. A crankshaft position sensor (CPS) 34 may measure an angular position of the crankshaft (e.g., in crank angle degrees, or CAD). The CPS 34 may also be used to determine the engine speed (e.g., in revolutions per minute, or RPM) based on a change in angular position during a period.

The drive torque may be transferred from the crankshaft 32 to a driveline 36 (e.g., wheels) of the vehicle via a transmission 38. For example, the transmission 38 may be coupled to the crankshaft 32 via a torque converter (e.g., a fluid coupling). The drive torque from the crankshaft 32 may also power the generator 16 (as previously described). A transmission output shaft speed (TOSS) sensor 40 measures a rotational speed of an output shaft of the transmission 38 (e.g., in RPM). For example, the measurement by the TOSS sensor 40 may indicate a speed of the vehicle.

Exhaust gas resulting from combustion may be expelled from the cylinders 26 into an exhaust manifold 42. The exhaust gas in the exhaust manifold 42 may be treated by an exhaust treatment system 44 to decrease emissions before being released into the atmosphere. The exhaust gas may also power a turbocharger 46 that may increase a pressure of (i.e., boost) the air inside the intake manifold 18. The increased air pressure may allow the engine 12 to generate more drive torque (when combined with more fuel). While turbocharger 46 is shown, however, the powertrain system 10 may include other types of forced air induction (e.g., a supercharger).

The powertrain system 10 may also include a starter 48. The starter 48 may be selectively engaged to start the engine 12. For example, the starter 48 may supply torque to the crankshaft 32 to start the engine 12. The powertrain system 10 may also include a driver input module 50. The driver input module 50 may translate input from a driver of the vehicle (represented by signal 51) to a control module 60. For example, the driver input module 50 may include an accelerator (e.g., a pedal), a brake (e.g., a pedal), a parking brake (e.g., a lever or pedal), and cruise controls. The driver input module 50, however, may also include other components (e.g., a switch that enables/disables engine start-stop). The driver input module 50 may also include various sensors that measure, for example only, accelerator position and brake pedal pressure.

The control module 60 receives signals from the electric motor 14, the battery system 15, the generator 16, the throttle 22, the MAF sensor 24, the fuel injectors 28, the spark plugs 30, the CPS 34, the transmission 38, the TOSS sensor 40, the exhaust treatment system 44, the turbocharger 46, the starter 48, and/or the driver input module 50. The control module 60 may control the electric motor 14, the battery system 15, the generator 16, the throttle 22 (e.g., electronic throttle control, or ETC), the fuel injectors 28, the spark plugs 30, the transmission 38, the exhaust treatment system 44, the turbocharger 46, and/or the starter 48. The control module 60 may also implement the system or method of the present disclosure.

Figure 2:
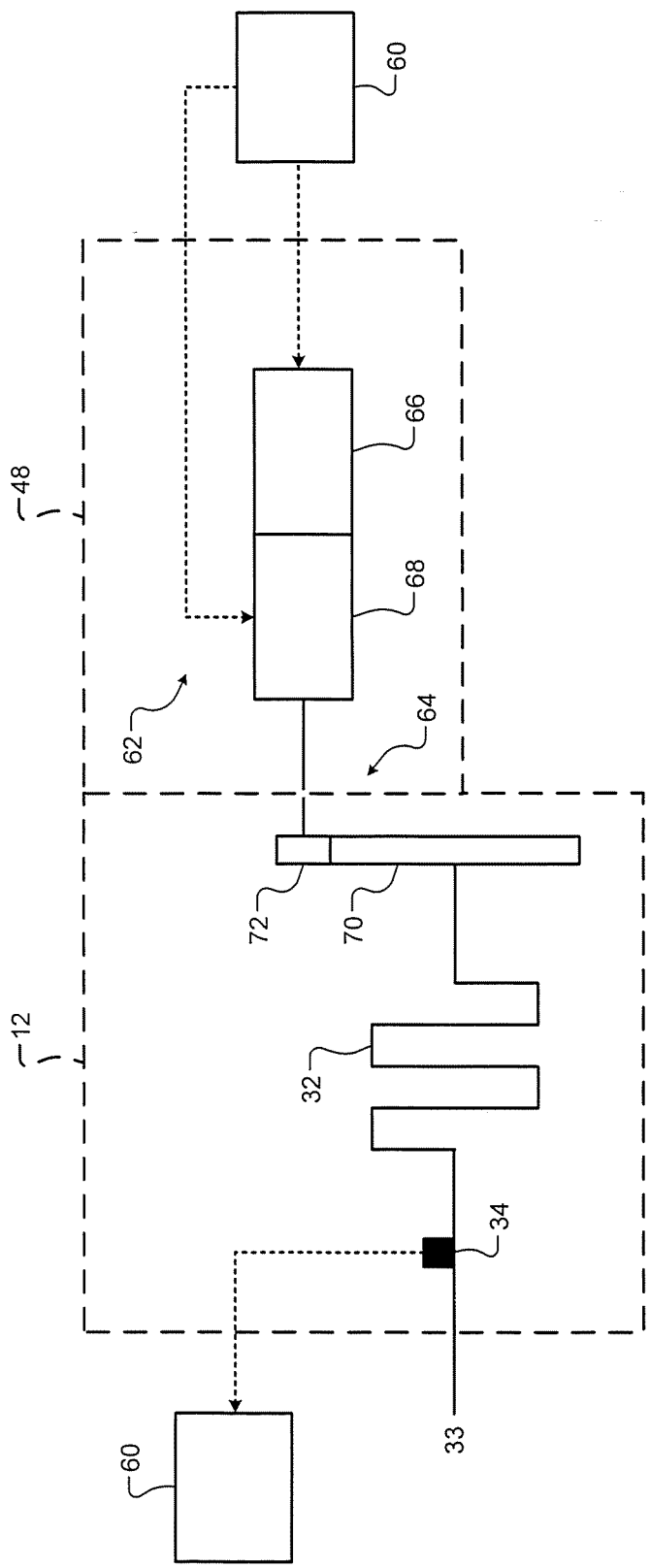
FIG. 2 is a functional block diagram of an exemplary engine and an exemplary starter according to the present disclosure.

Referring now to FIG. 2, linkage between the engine 12 and the starter 48 is shown in more detail. As previously described, pistons 33 may reciprocate within the cylinders 26 in response to combustion and transmit drive torque to the crankshaft 32. The crankshaft 32 rotates in response to the drive torque and may transmit the drive torque to the transmission 38 and/or the generator 16. For example, the CPS 34 may generate a CPS signal based on an angular position of the crankshaft 32. The CPS signal from the CPS 34 may be sent to the control module 60.

The starter 48 may further include a motor/actuator assembly 62 connected to the crankshaft 32 by a gear train 64. The motor/actuator assembly 62 may include a motor 66 and an actuator 68. The motor 66 may supply torque that is transmitted to the crankshaft 32 via the gear train 64. The actuator 68 may control whether the torque generated by the motor 66 is transmitted to the crankshaft 32. In various configurations, discussed in further detail below, the actuator 68 may be operable to selectively couple the motor 66 and one or more components of the gear train 64 with the crankshaft 32. For example, the motor 66 and/or the actuator 68 may be controlled by the control module 60.

The gear train 64 may include a driven member 70 and a driving member 72. The driven member 70 may be fixed to rotate with the crankshaft 32 and may be rotatably driven by the driving member 72. The driving member 72 may be coupled to the motor/actuator assembly 62 and may be configured to be engaged and disengaged with the driven member 70 at engine speeds greater than or equal to a predetermined speed (e.g., zero). In this regard, the driven member 70 may be a ring gear of the engine 12 and the driving member 72 may be a pinion gear of the starter 48.

When engaged with the driven member 70, the driving member 72 may transmit the torque supplied by the motor/actuator assembly 62 to the driven member 70. The actuator 68 may provide for the engagement and disengagement between the driven member 70 and the driving member 72. The motor/actuator assembly 62 may be activated to provide for the engagement of the driven member 70 and the driving member 72 and may be deactivated to provide for the disengagement of the driven member 70 and the driving member 72.

The motor/actuator assembly 62 and the gear train 64 may be arranged in ring and gear configuration. In this configuration, the driven member 70 may include a flywheel of the engine 12 having a ring gear and the driving member 72 may include a pinion gear of the starter 48 that meshes with the ring gear. The pinion gear may be a retractable pinion gear that meshes with the ring gear when extended and disengages from the ring gear when retracted. In such an arrangement, the actuator 68 of the motor/actuator assembly 62 may control the extension and retraction of the pinion gear.

Figure 3:
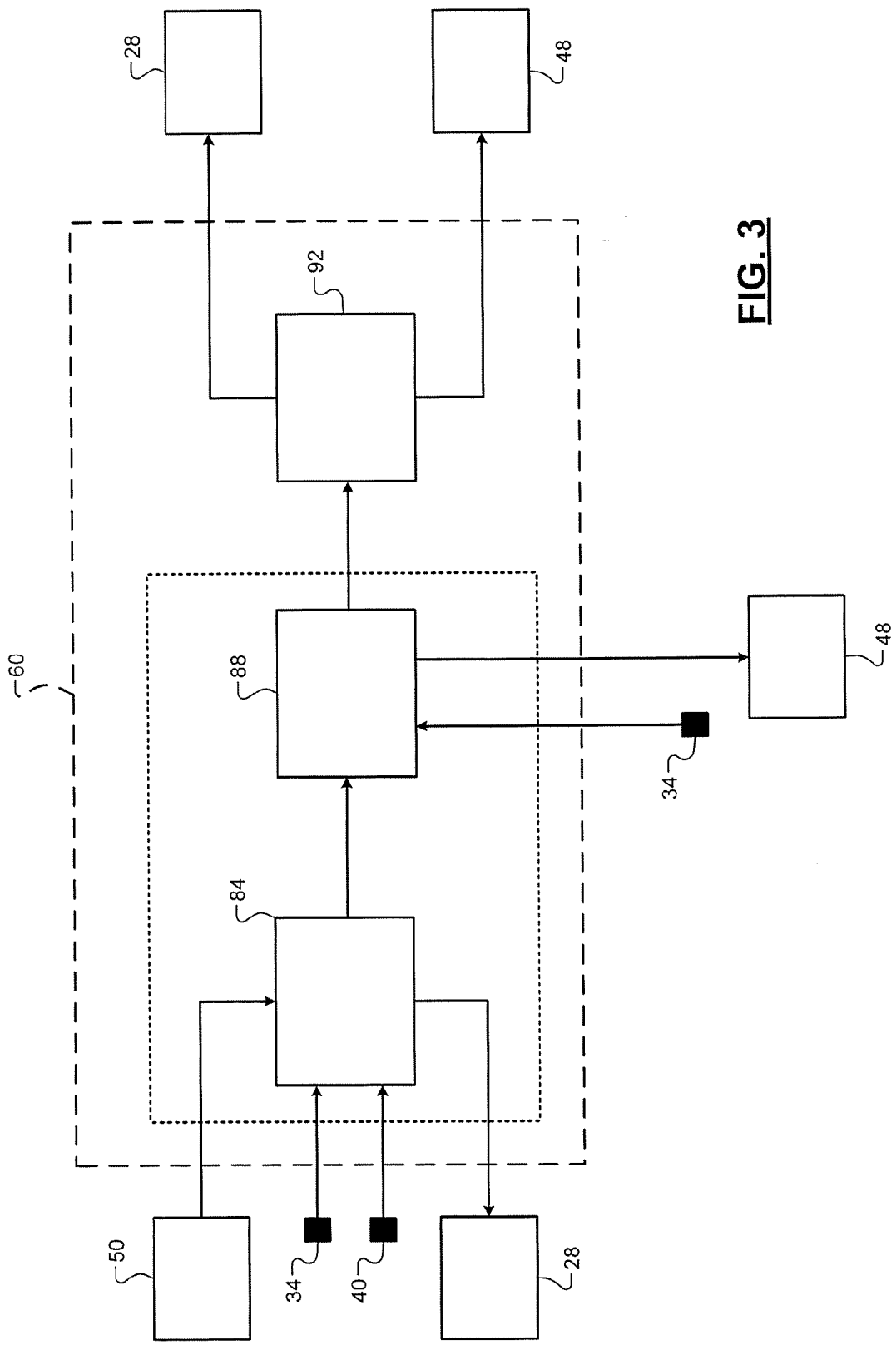
FIG. 3 is a functional block diagram of an exemplary control module according to the present disclosure.

Referring now to FIG. 3, the control module 60 is shown in more detail. The control module 60 may include a fuel control module 84, a position control module 88, and an engine-start module 92. The fuel control module 84 and the position control module 88 may be referred to collectively as an "engine-stop module." In other words, the engine-stop module stops the engine 12 by disabling fueling and stopping the crankshaft 32. The control module 60 may further include memory (not shown) that stores determined and predetermined parameters. For example, the memory (not shown) may include non-volatile memory (NVM).

The fuel control module 84 may disable fueling to the cylinders 26 of the engine 12. Rather, the fuel control module 84 may determine whether to disable fueling to the engine 12 based on driver input and other operating parameters. More specifically, the fuel control module 84 may receive signals indicating acceleration and braking (e.g., via the driver input module 50) and engine and vehicle speeds (e.g., from the CPS 34 and TOSS sensor 40, respectively). For example, the fuel control module 84 may disable fueling to the engine 12 when the acceleration is less than or equal to a predetermined acceleration threshold (e.g., zero), the braking is greater than or equal to a predetermined braking threshold (e.g., full brake engagement), and the engine speed and vehicle speed are less than predetermined speed thresholds, respectively. The fuel control module 84, however, may also determine whether to disable fueling to the engine 12 based on other combinations of driver input, operating parameters, and respective thresholds.

Specifically, the fuel control module 84 may disable fueling to the cylinders 26 according to a predetermined schedule. For example, the fuel control module 84 may disable fueling to the cylinders 26 by generating control signals for the fuel injectors 28. More specifically, disabling fueling to the cylinders 26 according to the predetermined schedule allows the fuel control module 84 to control of the rate of engine speed decay. Additionally, controlling the rate of engine speed decay provides for more accurate positioning of the crankshaft 32. Additionally, for example only, the control module 60 may apply a load to the engine 12 to increase the rate of engine speed decay.

The position control module 88 positions the crankshaft 32 to a desired position. For example, the desired position of the crankshaft 32 may correspond to a first cylinder having a compression cycle when the engine 12 is restarted. Specifically, the position control module 88 may engage the starter pinion 72 to the engine ring gear 70 at less than a predetermined engagement threshold (e.g., partial but not full engagement). The position control module 88 may then monitor (e.g., using the CPS 34) whether the position of the crankshaft 32 is less than a predetermined distance (e.g., CAD) from the desired position. When the position of the crankshaft 32 is less than the predetermined distance from the desired position, the position control module 88 may energize the starter motor 48 to stop the crankshaft 32 at the desired position. For example, the position control module 88 may energize the starter 48 by supplying the starter motor 68 with one of a proportional current and a proportional voltage.

The engine-start module 92 may selectively restart the engine 12 based on driver input (e.g., via the driver input module 50). For example, the engine-start module 92 may restart the engine when the driver is accelerating. Specifically, the engine-start module 92 may restart the engine 12 by enabling fueling to the cylinders 26. More specifically, the engine-start module 92 may enable fueling to the cylinders 26 beginning with the first cylinder having a compression cycle. For example only, the first cylinder having a compression cycle may be a first cylinder of the engine 12 (i.e., the upper-left cylinder). The first cylinder having a compression cycle, however, may be any of the plurality of cylinders 26 (e.g., the second, or upper-right cylinder). In other words, beginning fueling at the first cylinder having a compression cycle may provide for a faster and/or more efficient start operation. Additionally, the starter 48 may be used in assisting the engine-start operation.

Figure 4:
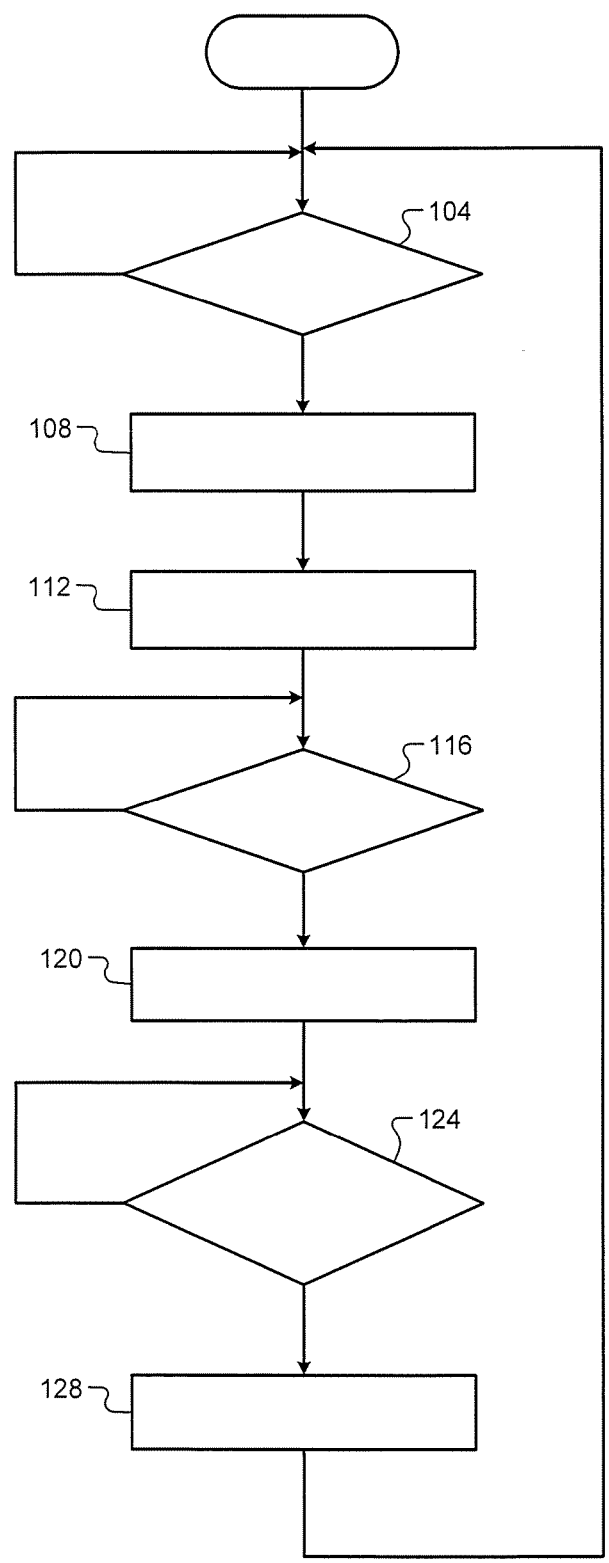
FIG. 4 is a flow diagram of an exemplary method for controlling engine start-stop operations according to the present disclosure.

Referring now to FIG. 4, a method for controlling start-stop operations of the engine 12 begins at 104. At 104, the control module 60 may determine whether an engine-stop operation is required. If true, control may proceed to 104. If false, control may return to 104.

At 108, the control module 60 may disable fueling to the cylinders 26 according to the predetermined schedule to control the rate of engine speed decay. At 112, the may engage the starter pinion 72 to the engine ring gear 70 at less than the predetermined engagement threshold (e.g., partial not full engagement). At 116, the control module 60 may monitor whether the crankshaft position (CP) is within a predetermined distance ($TH_D$) from the desired position ($CP_{DES}$) of the crankshaft 32 ($|CP_{DES}-CP|<TH_D$). For example, CP may be measured using the CPS 34 and $TH_D$ may include an angular distance (e.g., CAD). If true, control may proceed to 120. If false, control may return to 116.

At 120, the control module 60 may energize the starter 48 (e.g., via a proportional current or proportional voltage) to stop the crankshaft 32 at the desired position $CP_{DES}$. At 124, the control module 60 may determine whether both an engine-start operation is required (e.g., driver accelerating). If true, control may proceed to 128. If false, control may return to 124. At 128, the control module 60 may start the engine by enabling fueling to the engine 12 beginning with the first cylinder having a compression cycle. Control may then return to 104.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a vehicle that includes an engine, comprising:
   an engine-stop module that determines whether to stop the engine based on at least one of input from a driver of the vehicle and vehicle operating parameters; and
   a fuel control module that stops the engine and controls a rate of engine speed decay by disabling fueling to cylinders of the engine according to a predetermined sequence.

2. The control system of claim 1, further comprising:
   a position control module that engages a starter to a crankshaft of the engine and actuates the starter to command the crankshaft to a desired position, wherein the desired position corresponds to a first cylinder having a compression cycle.

3. The control system of claim 2, further comprising:
   an engine-start module that selectively restarts the engine based on the input from the driver of the vehicle by enabling fueling to the cylinders of the engine beginning with the first cylinder having a compression cycle.

4. The control system of claim 2, wherein engaging the starter to the crankshaft includes engaging a pinion of the starter to a ring gear coupled to the crankshaft at less than a predetermined engagement threshold.

5. The control system of claim 2, wherein the position control module actuates the starter to command the crankshaft to the desired position when the position of the crankshaft is less than a predetermined distance from the desired position.

6. A control system for a vehicle that includes an engine, comprising:
   an engine-stop module that determines whether to stop the engine based on at least one of input from a driver of the vehicle and vehicle operating parameters; and
   a position control module that stops the engine by engaging a starter to a crankshaft of the engine and actuating the starter to command the crankshaft to a desired position, wherein the desired position corresponds to a first cylinder of the engine having a compression cycle.

7. The control system of claim 6, further comprising:
   a fuel control module that controls a rate of engine speed decay by disabling fueling to cylinders of the engine according to a predetermined sequence.

8. The control system of claim 6, further comprising:
   an engine-start module that selectively restarts the engine based on the input from the driver of the vehicle by enabling fueling to the cylinders of the engine beginning with the first cylinder having a compression cycle.

9. The control system of claim 6, wherein engaging the starter to the crankshaft includes engaging a pinion of the starter to a ring gear coupled to the crankshaft at less than a predetermined engagement threshold.

10. The control system of claim 6, wherein the position control module actuates the starter to command the crankshaft to the desired position when the position of the crankshaft is less than a predetermined distance from the desired position.

11. A method for controlling an engine of a vehicle, comprising:
    determining whether to stop the engine based on at least one of input from a driver of the vehicle and vehicle operating parameters; and
    stopping the engine and controlling a rate of engine speed decay by disabling fueling to cylinders of the engine according to a predetermined sequence.

12. The method of claim 11, further comprising:
    engaging a starter to a crankshaft of the engine and actuating the starter to command the crankshaft to a desired position, wherein the desired position corresponds to a first cylinder having a compression cycle.

13. The method of claim 12, further comprising:
    selectively restarting the engine based on the input from the driver of the vehicle by enabling fueling to the cylinders of the engine beginning with the first cylinder having a compression cycle.

14. The method of claim 12, wherein engaging the starter to the crankshaft includes engaging a pinion of the starter to a ring gear coupled to the crankshaft at less than a predetermined engagement threshold.

15. The method of claim 12, further comprising actuating the starter to command the crankshaft to the desired position when the position of the crankshaft is less than a predetermined distance from the desired position.

16. A method for controlling an engine of a vehicle, comprising:
    determining whether to stop the engine based on at least one of input from a driver of the vehicle and vehicle operating parameters; and
    stopping the engine by engaging a starter to a crankshaft of the engine and actuating the starter to command the crankshaft to a desired position, wherein the desired position corresponds to a first cylinder of the engine having a compression cycle.

17. The method of claim 16, further comprising:
    controlling a rate of engine speed decay by disabling fueling to cylinders of the engine according to a predetermined sequence.

18. The method of claim 16, further comprising:
    selectively restarting the engine based on the input from the driver of the vehicle by enabling fueling to the cylinders of the engine beginning with the first cylinder having a compression cycle.

19. The method of claim 16, wherein engaging the starter to the crankshaft includes engaging a pinion of the starter to a ring gear coupled to the crankshaft at less than a predetermined engagement threshold.

20. The method claim 16, further comprising actuating the starter to command the crankshaft to the desired position when the position of the crankshaft is less than a predetermined distance from the desired position.

* * * * *